(12) United States Patent
Hayakawa et al.

(10) Patent No.: US 6,934,133 B2
(45) Date of Patent: Aug. 23, 2005

(54) THREE TERMINAL MAGNETIC HEAD HAVING A MAGNETIC SEMICONDUCTOR AND A TUNNEL MAGNETORESISTIVE FILM AND MAGNETIC RECORDING APPARATUS INCLUDING THE HEAD

(75) Inventors: Jun Hayakawa, Sendai (JP); Kenchi Ito, Sendai (JP)

(73) Assignee: Hitachi, Ltd., Tokyo (JP)

( * ) Notice: Subject to any disclaimer, the term of this patent is extended or adjusted under 35 U.S.C. 154(b) by 259 days.

(21) Appl. No.: 10/374,089

(22) Filed: Feb. 27, 2003

(65) Prior Publication Data

US 2004/0136120 A1 Jul. 15, 2004

(30) Foreign Application Priority Data

Jan. 15, 2003 (JP) ........................... 2003-006662

(51) Int. Cl.[7] .................... G11B 5/127; G11B 5/33
(52) U.S. Cl. ..................................... 360/324.2
(58) Field of Search .................. 360/324.2, 324.1, 360/322, 324, 313, 110

(56) References Cited

U.S. PATENT DOCUMENTS 6,134,089 A * 10/2000 Barr et al. .................. 360/322

2003/0179510 A1 * 9/2003 Hayakawa ............... 360/324.1
2003/0214763 A1 * 11/2003 Childress et al. ........ 360/324.2

FOREIGN PATENT DOCUMENTS

| JP | 4-358310 | 11/1991 |
| JP | 10-4227 | 3/1997 |

OTHER PUBLICATIONS

R. Jansen, P.S. Anil Kumar, O.M.J. van't Erve, R. Vlutters, P. de Haan, and J.C. Lodder, "Thermal Spin–Wave Scattering in Hot–Electron Magnetotransport Across a Spin Valve", Physical Review Letters, vol. 85, No. 15, Oct. 2000, pp. 3277–3280.

* cited by examiner

*Primary Examiner*—Julie Anne Watko
(74) *Attorney, Agent, or Firm*—Reed Smith LLP; Stanley P. Fisher, Esq.; Juan Carlos A. Marquez, Esq.

(57) ABSTRACT

A three terminal magnetoresistance head capable of providing a high output and a large output current is provided. A MIS junction multilayer film composed of a magnetic semiconductor, a metal magnetic multilayer film, and a tunnel magnetoresistance element is applied to a three terminal magnetoresistance device.

28 Claims, 11 Drawing Sheets

THREE TERMINAL MAGNETIC HEAD HAVING A MAGNETIC SEMICONDUCTOR AND A TUNNEL MAGNETORESISTIVE FILM AND MAGNETIC RECORDING APPARATUS INCLUDING THE HEAD

BACKGROUND OF THE INVENTION

1. Field of the Invention

The present invention relates to a three terminal magnetic head using a three terminal magnetoresistance device in a head for magnetically reproducing information recorded magnetically and to an ultrahigh-density magnetic recording/reproducing apparatus comprising the three terminal magnetic head.

2. Description of the Related Art

For use in a reproducing portion of a magnetic head used in a high-density magnetic recording apparatus, a CIP-GMR (Current-In-Plane Giant Magnetoresistance) device which allows a current to flow in the in-plane direction of a film and a tunnel magnetoresistance device have been proposed, which are disclosed in Japanese Unexamined Patent Publication No. HEI 4-358310 (Patent Document 1) and Japanese Unexamined Patent Publication No. HEI 10-4227 (Patent Document 2), respectively. On the other hand, "Physical Review Letters. Vol. 85, 3277 (2000) (Non-Patent Document 1) has recently reported the room-temperature operation of a three terminal spin transistor capable of producing an output several tens of times as large as outputs produced by these magnetoresistance devices, the application of which to a magnetic head has been expected. The higher output of the three terminal spin transistor has been achieved by using a Co/Cu/Co giant magnetoresistance device for the base of a transistor structure and injecting hot electrons into the GMR device by using a Schottky barrier formed at the semiconductor (emitter)/metal (base) interface. Although the injection of hot electrons is effective in increasing the output of the MR device, a problem is encountered that a collector current outputted with a metal/semiconductor Schottky barrier thus far reported is on the order of 1 nA, which is extremely small.

SUMMARY OF THE INVENTION

The present invention pertains to a magnetic head for an ultrahigh-density recording/reproducing apparatus and it is therefore an object of the present invention to provide a device which fulfills the following tasks presented by a conventional three terminal magnetoresistance device, i.e., a three terminal magnetic head using a three terminal magnetoresistance device composed of a magnetic semiconductor, a magnetic multilayer film, and a TMR element and an ultrahigh-density magnetic recording/reproducing apparatus using the three terminal magnetic head.

The first task is to increase the output of the magnetoresistance device.

The second task is to achieve an optimum current density in the TMR element portion.

To attain the object, the present invention uses, in a three terminal magnetic head, a three terminal magnetoresistance device comprising: a magnetic semiconductor; a magnetic multilayer film having a first ferromagnetic layer formed on the magnetic semiconductor, a second ferromagnetic layer formed on the first ferromagnetic layer, and a first non-magnetic layer formed between the first and second ferromagnetic layers; a tunnel magnetoresistive film having the second ferromagnetic layer, a third ferromagnetic layer formed on the second ferromagnetic layer, and a first tunnel barrier layer formed between the second and third ferromagnetic layers; a first electrode connected electrically to the magnetic semiconductor; a second electrode connected electrically to any one of the first ferromagnetic layer, the first non-magnetic layer, and the second ferromagnetic layer; and a third electrode connected electrically to the third ferromagnetic layer, a current being allowed to flow between the first and third electrodes to allow a tunnel current to flow into the tunnel magnetoresistive film through the magnetic semiconductor and the magnetoresistive film, a direction of magnetization of the second ferromagnetic layer changing upon application of an external magnetic field and a resistance change caused by the changed direction of magnetization being detected by the second and third electrodes. In such a three terminal magnetoresistance device, the direction of magnetization of the third ferromagnetic layer is fixed by an antiferromagnetic layer formed on a side opposite to a side opposing the first tunnel barrier layer.

A second tunnel barrier layer, a second non-magnetic layer, and a third tunnel barrier layer are formed between the magnetic semiconductor and the second ferromagnetic layer, while the second tunnel barrier layer is between the magnetic semiconductor and the second ferromagnetic layer, and the third tunnel barrier layer is between the magnetic semiconductor and the second non-magnetic layer, respectively.

Alternatively, the present invention uses a three terminal magnetoresistance device comprising: a magnetic semiconductor; a non-magnetic layer formed on the magnetic semiconductor; a tunnel magnetoresistive film having first and second ferromagnetic layers formed on the non-magnetic layer, a first tunnel barrier layer formed between the first and second ferromagnetic layers, and an antiferromagnetic layer formed on the second ferromagnetic layer; a first electrode connected electrically to the magnetic semiconductor; a second electrode connected electrically to either one of the first ferromagnetic layer and the non-magnetic layer; and a third electrode connected electrically to either one of the second ferromagnetic layer and the antiferromagnetic layer, a current being allowed to flow between the first and third electrodes to allow a tunnel current to flow into the tunnel magnetoresistive film through the magnetic semiconductor and the magnetoresistive film, a direction of magnetization of the first ferromagnetic layer changing upon application of an external magnetic field and a resistance change caused by the changed direction of magnetization being detected by the second and third electrodes.

In foregoing three terminal magnetic head, the magnetic semiconductor contains at least one of Ga, As, Cr, Mn, N, Fe, Co, Ge, Si, and C, each of the first ferromagnetic layer, the second ferromagnetic layer, and the third ferromagnetic layer contains any one of Co, Fe, and Ni, and each of the first and second non-magnetic layers contains any one of Cu, Au, Ag, and Pt.

DESCRIPTION OF THE PREFERRED EMBODIMENTS

The present invention has formed a multilayer film consisting of a GMR element and a TMR element stacked in layers on a magnetic semiconductor, injected highly polarized spin electrons from the magnetic semiconductor into the multilayer film, and thereby increased the output of the TMR element. The present invention has also achieved the same effect by disposing a proper non-magnetic film or a tunnel barrier film on the magnetic semiconductor in place of the GMR element. A Schottky barrier, a tunnel barrier, or an ohmic junction is formed between the magnetic semiconductor and the multilayer film and the highly polarized hot electrons or highly polarized spins are injected ballistically or diffusively.

The provision of a proper non-magnetic layer, tunnel barrier layer, or GMR film between the magnetic semiconductor and the TMR element allows the formation of an interface through which the highly polarized spins can be injected with a high efficiency and the formation of a device with a high spin-dependent conductivity. In addition, the foregoing means achieves an optimum current density in the TMR element portion.

Referring to the drawings, the embodiments of the present invention will be described in detail.

Embodiment 1

Figure 1:
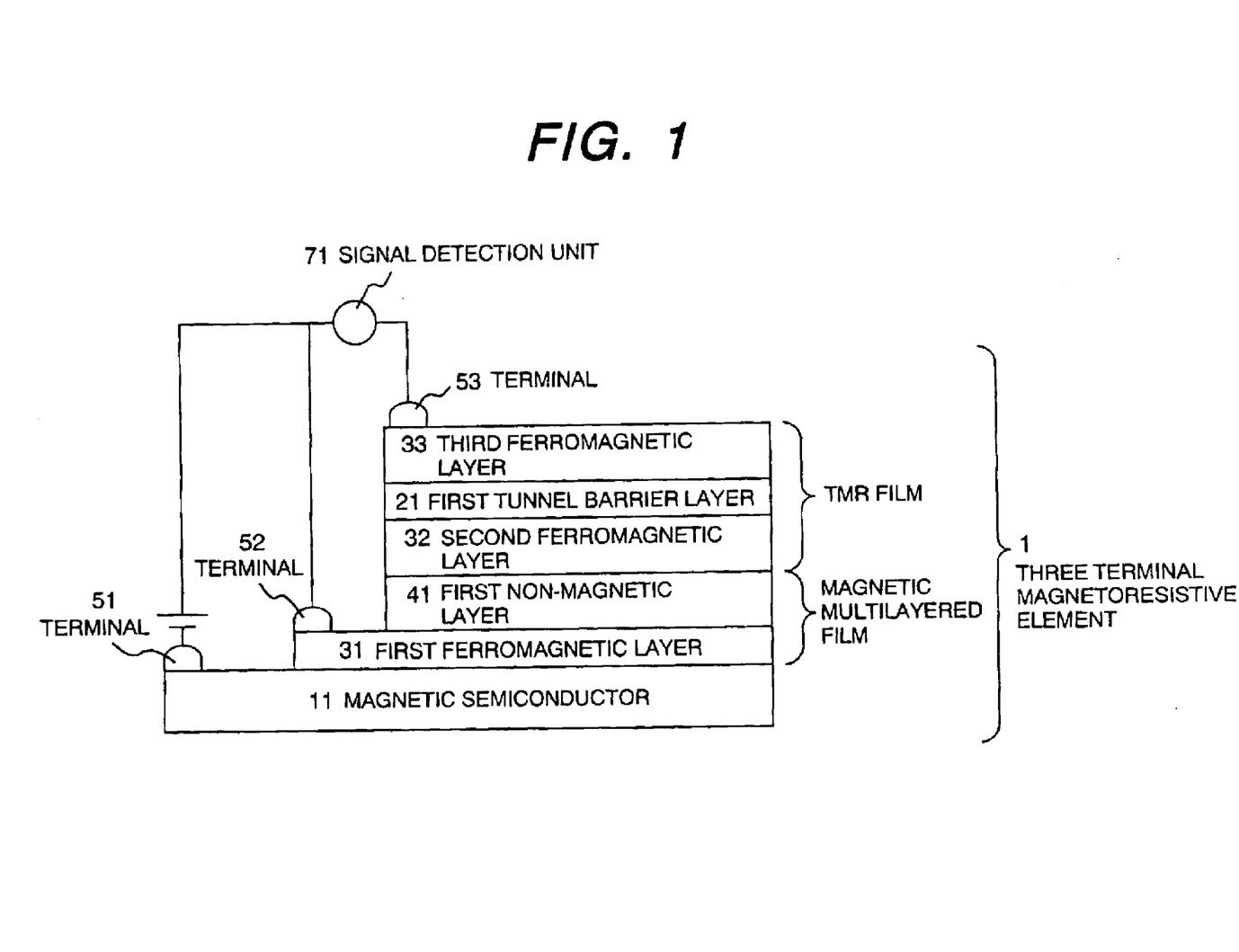
FIG. 1 is a view showing an example of a structure of a three terminal magnetoresistance device used in a three terminal magnetic head according to the present invention.

FIG. 1 shows one of the embodiments of the present invention. A first ferromagnetic layer 31 is formed on a magnetic semiconductor 11 and a first non-magnetic layer 41 is formed thereon to form a magnetic multilayer film. A second ferromagnetic layer 32, a first tunnel barrier layer 21, and a third ferromagnetic layer 33 are stacked successively on the magnetic multilayer film, thereby forming a tunnel magnetoresistive film.

Electrodes 51, 52, and 53 are disposed on respective end portions of the magnetic semiconductor 11, the first ferromagnetic layer 31, and the third ferromagnetic layer 33. The electrode 52 may also be disposed on any of the first ferromagnetic layer 31, the first non-magnetic layer 41, and the second ferromagnetic layer 32. The electrodes 51, 52, and 53 are insulated from each other such that an electric leakage does not occur.

A description will be given next to the principle of operation of the three terminal magnetoresistance device according to the present invention. The magnetization of the second ferromagnetic layer 32 freely rotates in the presence of an external magnetic field (H). In accordance with the angle of rotation, an electric resistance perpendicular to the plane of a film between the second and third ferromagnetic layers 32 and 33 with the first tunnel barrier interposed therebetween changes so that a magnetoresistance effect occurs. The device according to the present invention is a three terminal magnetoresistance device which allows a current to flow from the electrode 51 to the electrode 53 and outputs the magnetoresistance effect via a signal detection unit 71 provided between the electrodes 52 and 53. The output mode is either a voltage-detection output mode or a current-detection output mode. The current applied from the electrode 51 passes through the magnetic semiconductor and flows into the magnetic multilayer film (which is a GMR film in this case) composed of the first ferromagnetic layer 31, the first non-magnetic layer 41, and the second ferromagnetic layer 32. In this case, conductive electrons in the magnetic semiconductor are highly polarized electron spins, which are injected into the multilayer film. The resulting effect and the effect of spin filtering in the GMR film combine to achieve a large magnetoresistance effect.

A description will be given next to various materials of the three terminal magnetoresistive film and a method for the production thereof. On a GaAs substrate, GaMnAs was formed as the magnetic semiconductor 11 by MBE (Molecular Beam Epitaxy). Then, the overlying multilayer film was formed by a sputtering method without exposing the magnetic semiconductor 11 to an atmosphere.

For the first ferromagnetic metal layer 31 and the first non-magnetic layer, CoFe2 nm and Cu2 nm were used, respectively. For the second ferromagnetic layer 32, CoFe2 nm was used. For the overlying first tunnel barrier layer 32, $Al_2O_3$ 2 nm was used. The plasma oxidization and natural oxidization of an Al metal film were used for the formation of the Al2O3. The third ferromagnetic layer 33 was made of CoFe2 nm.

Besides the materials mentioned above, the following materials may also be used. For the magnetic semiconductor 11, GaMnN, CrAs, CrSb, CoTiO2, CoZnO, MnZnO, MnC, MnAs, MnSi, FeSi, FeGe, MnGe, or MnC may be used in place of GaMnAs. For the first non-magnetic layer 41, Au, Ag, or Pt may also be used in place of Cu. For the first ferromagnetic layer 31, Co or NiFe may also be used in place of CoFe. For the second ferromagnetic layer 32, a CoFe/NiFe multilayer film may also be used in place of CoFe. For the third ferromagnetic layer 33, a so-called CoFe/Ru/CoFe synthetic ferrimagnet structure may also be used.

Photolithography, etching, and EB lithography were used for the formation of the device.

Figure 14:
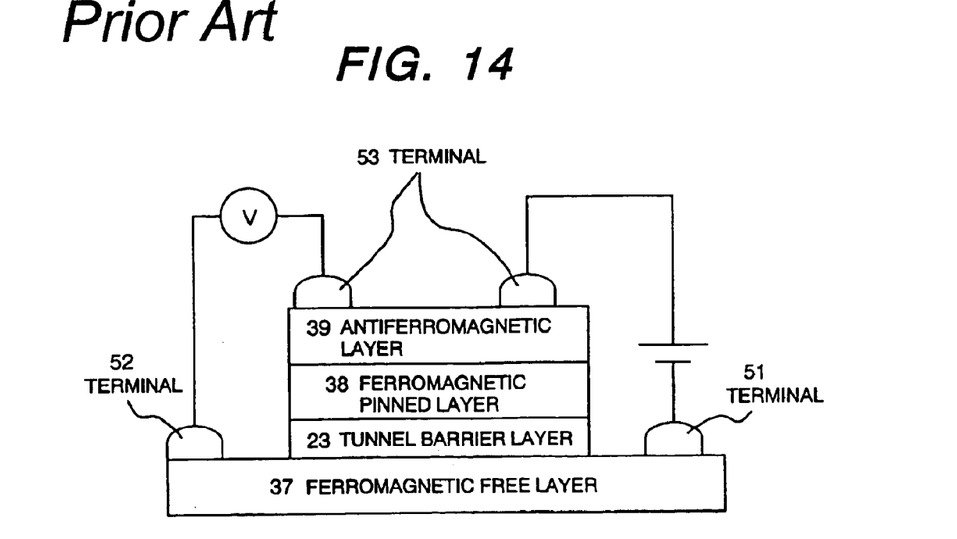
FIG. 14 is a view showing an example of a fundamental structure of a conventional tunnel magnetoresistance device.

The magnetoresistance effect obtained in the three terminal magnetoresistance device thus fabricated was 200%. The characteristic shows a value larger by one order of magnitude than the rate of resistance change (30%) of a conventional tunnel magnetoresistance device. The current between the electrodes 52 and 53 was 1000 $\mu$A, which is a value nearly the same as a current value applied in the conventional tunnel magnetoresistance device. FIG. 14 shows the fundamental structure of the conventional tunnel magnetoresistance device used for comparison. The ferromagnettic-free-layer/tunnel-barrier-layer/ferromagnetic-fixed-layer multilayer film has CoFe/Al2O3/CoFe film compositions.

Embodiment 2

Figure 2:
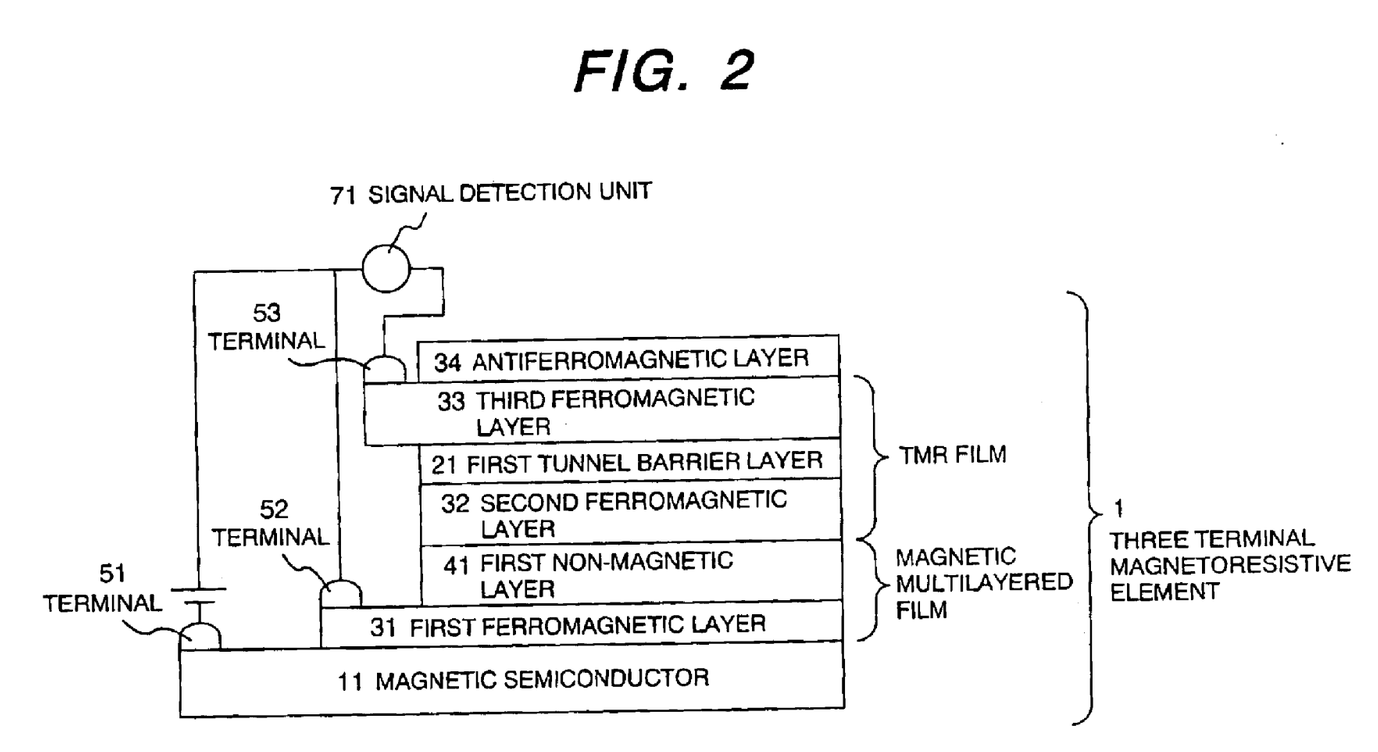
FIG. 2 is a view showing another example of the structure of the three terminal magnetoresistance device used in the three terminal magnetic head according to the present invention.
Figure 3:
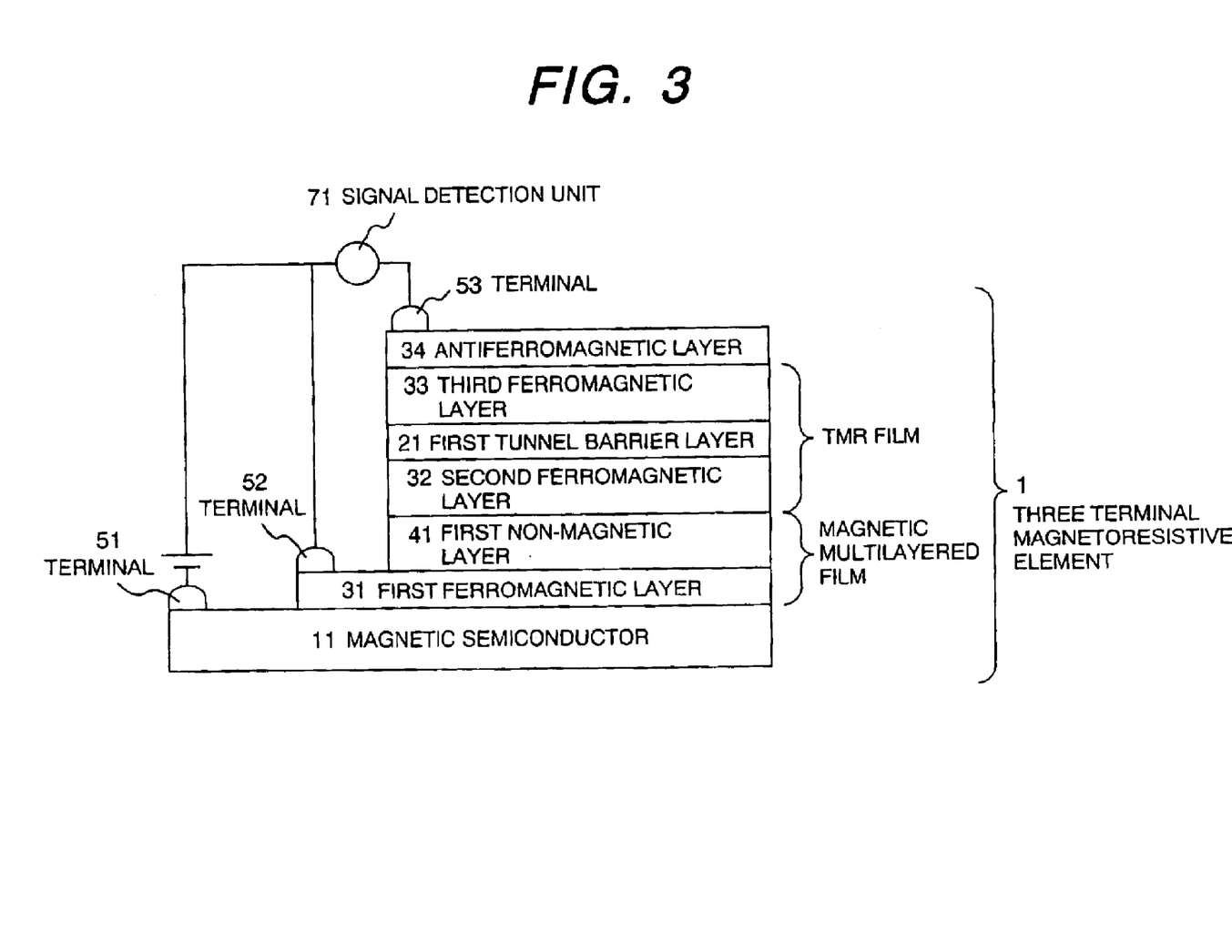
FIG. 3 is a view showing still another example of the structure of the three terminal magnetoresistance device used in the three terminal magnetic head according to the present invention.

FIG. 2 shows a structure obtained by providing an antiferromagnetic layer on the third ferromagnetic layer in the structure shown in FIG. 1. The device formation method was implemented by using photolithograph), etching, and EB lithography in the same manner as in EMBODIMENT 1. The antiferromagnetic layer 34 was made of MnPt12 nm. The electrode 53 may also be disposed on the third antiferromagnetic layer 34, as shown in FIG. 3. The magnetoresistance effect obtained in the three terminal magnetoresistance device thus produced was 300%. The current between the electrodes 52 and 53 was 100 $\mu$A. In the structure, the antiferromagnetic layer performs the function of fixing the direction of magnetization of the third ferromagnetic layer and increasing the output.

Embodiment 3

Figure 4:
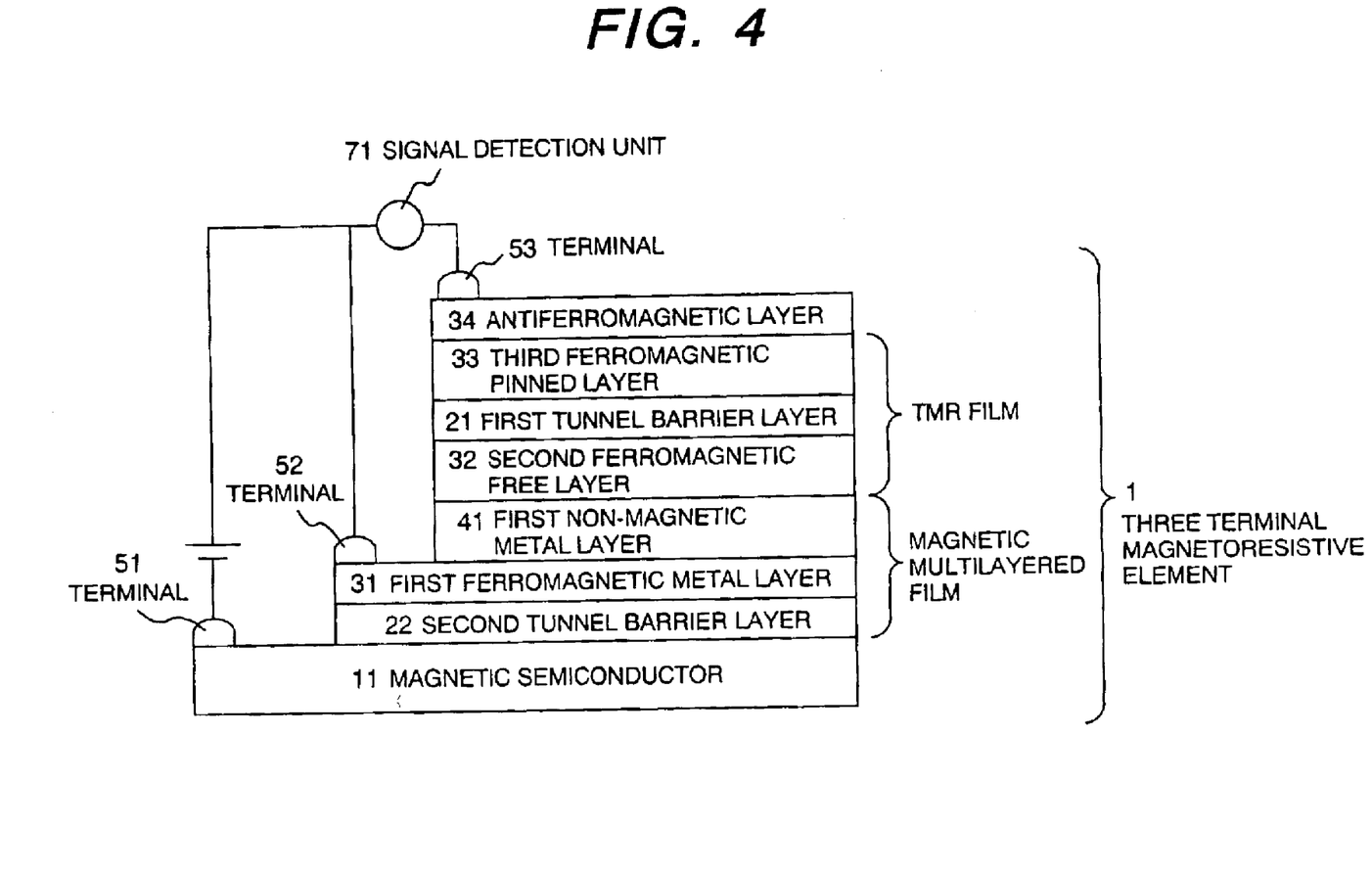
FIG. 4 is a view showing yet another example of the structure of the three terminal magnetoresistance device used in the three terminal magnetic head according to the present invention.

FIG. 4 shows a structure obtained by providing a second tunnel barrier layer 22 between the first ferromagnetic layer 31 and the magnetic semiconductor 11 in the structure shown in FIG. 3.

The device formation method was implemented by using photolithography, etching, and EB lithography in the same manner as in EMBODIMENT 1.

The provision of the second tunnel barrier 22 allows control of the state of electrons formed at the interface with the magnetic semiconductor 1. Since a tunnel current allows a current to flow ballistically from the magnetic semiconductor in the present embodiment, the efficiency with which highly polarized spins are injected is increased so that the output is increased. The magnetoresistance effect obtained in the present embodiment was 400 and the current obtained was 100 $\mu$A.

Embodiment 4

Figure 5:
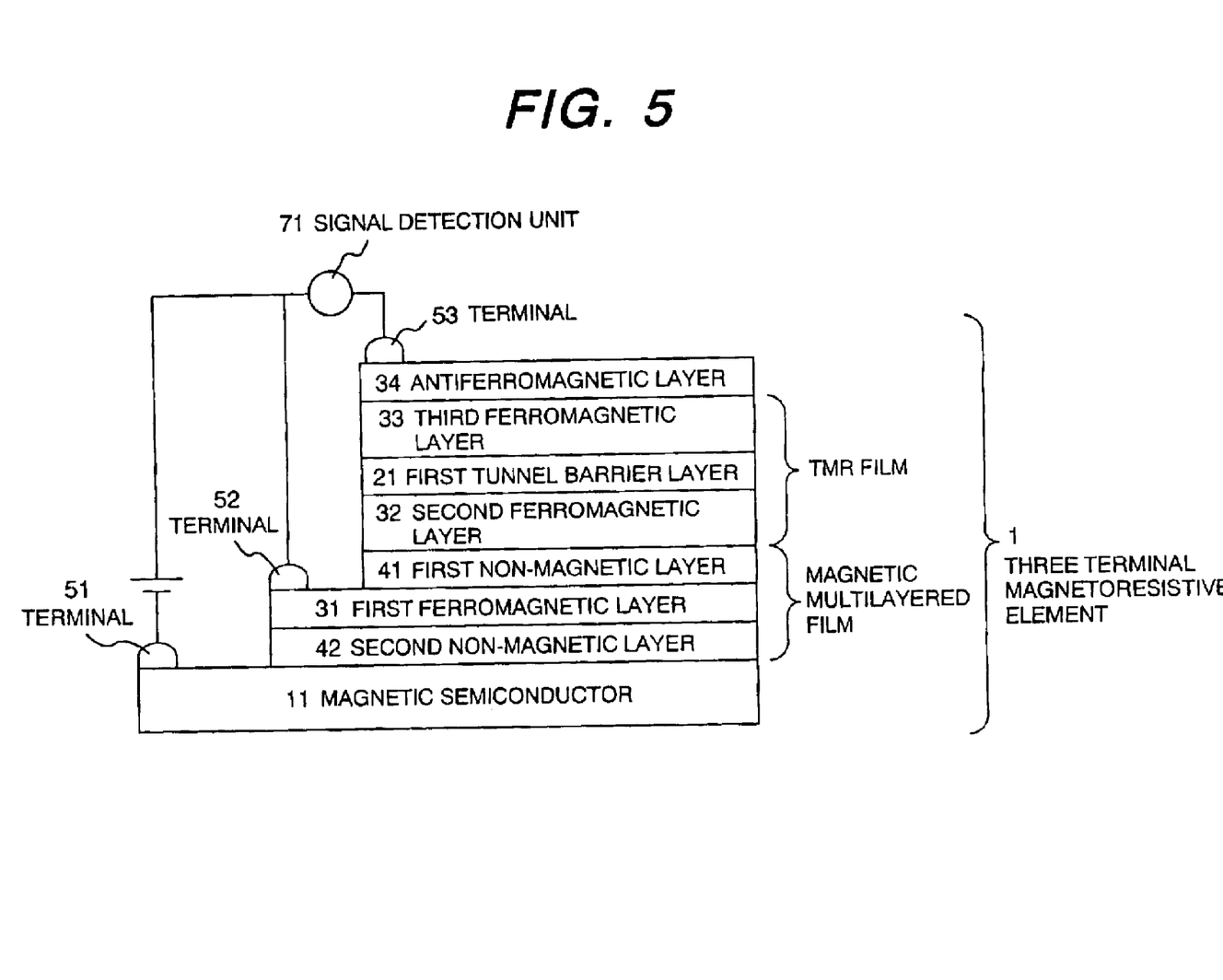
FIG. 5 is a view showing still another example of the structure of the three terminal magnetoresistance device used in the three terminal magnetic head according to the present invention.

FIG. 5 shows a structure obtained by providing a second non-magnetic layer 42 between the first ferromagnetic layer and the magnetic semiconductor 11 in the structure shown in FIG. 3. The materials used for the device according to the present embodiment are the same as used for the structure described in EMBODIMENT 1. For the tunnel barrier 21 in the structure according to the present embodiment, Al2O3 formed by oxidizing an Al metal film was used.

The device formation method was implemented by using photolithography, etching, and EB lithography in the same manner as in EMBODIMENT 1.

The provision of the second non-magnetic layer 42 allows control of the state of electrons formed at the interface with the magnetic semiconductor 1. Since highly polarized spins are injected diffusively from the magnetic semiconductor in the present embodiment, the output is reduced. However, since conductive electrons in the magnetic semiconductor are semi-metallic, an ohmic junction is formed at the interface between the magnetic semiconductor and the first non-magnetic metal layer so that the resistance is reduced. Consequently, the present embodiment achieves a larger effect of suppressing of the attenuation of a current than in the case shown in FIG. 3 (EMBODIMENT 2). In the present embodiment, the value of the current between the electrodes 52 and 53 was about 1 mA, though the magnetoresistance effect obtained was 150%.

Embodiment 5

Figure 6:
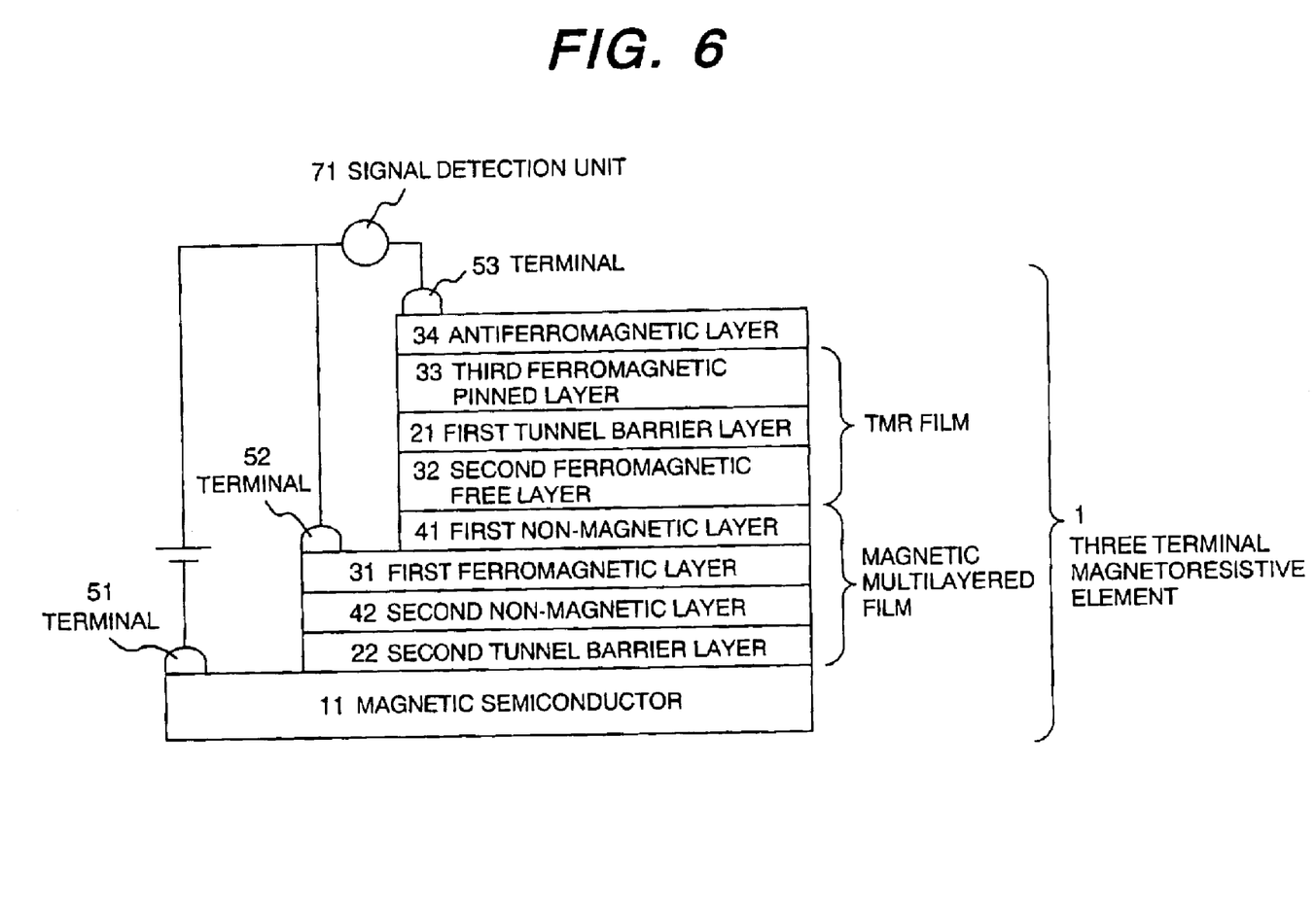
FIG. 6 is a view showing yet another example of the structure of the three terminal magnetoresistance device used in the three terminal magnetic head according to the present invention.

FIG. 6 shows another of the embodiments of the present invention. The second tunnel barrier 22 is formed additionally on the magnetic semiconductor 11 in the structure shown in FIG. 5 and the second non-magnetic metal layer 42, the first ferromagnetic metal layer 31, the first non-magnetic metal layer 41, a second ferromagnetic free layer 32, the first tunnel barrier 21, a third ferromagnetic pinned layer 33, and the antiferromagnetic layer 34 are formed successively on the second tunnel barrier 22.

The electrodes 51, 52, and 53 are disposed on the respective end portions of the magnetic semiconductor 11, the first ferromagnetic layer 31, and the antiferromagnetic layer 34. The electrode 52 may also be disposed on any of the first ferromagnetic layer 31, the first non-magnetic layer 41, and the second ferromagnetic layer 32. The electrodes 51, 52, and 53 are insulated from each other such that an electric leakage does not occur.

A description will be given next to the principle of operation of the three terminal magnetoresistance device according to the present invention. The magnetization of the second ferromagnetic layer 32 freely rotates in the presence of an external magnetic field (H). In accordance with the angle of rotation, an electric resistance perpendicular to the plane of a film between the second and third ferromagnetic layers 32 and 33 with the first tunnel barrier interposed therebetween changes so that a magnetoresistance effect occurs. A current is allowed to flow from the electrode 51 to the electrode 53 and the magnetoresistance effect is outputted via the signal detection unit 71. The output mode is either a voltage-detection output mode or a current-detection output mode. The current applied from the electrode 51 passes through the magnetic semiconductor and flows into the GMR film consisting of the second non-magnetic layer 42, the first ferromagnetic layer 31, the first non-magnetic layer 41, and the ferromagnetic layer 32 through the second tunnel barrier 22. In this case, conductive electrons in the magnetic semiconductor are highly polarized electron spins which flow through the first tunnel barrier, so that highly polarized spin electrons are injected into the multilayer film formed above the first non-magnetic layer 41. The resulting effect and the effect of spin filtering in the GMR film combine to achieve a large magnetoresistance effect.

A description will be given next to various materials of the three terminal magnetoresistive film and a method for the production thereof. On the GaAs substrate, GaMnAs was formed as the magnetic semiconductor 11 by MBE (Molecular Beam Epitaxy). Then, AlAs2 nm was formed similarly by MBE as the second tunnel barrier 22. Subsequently, the overlying multilayer film was formed by a sputtering method without exposing the magnetic semiconductor 11 to an atmosphere. For the second non-magnetic layer 41, the first ferromagnetic metal layer 31, and the first non-magnetic layer, Cu2 nm, CoFe2 nm, and Cu2 nm were used, respectively. For the second ferromagnetic layer 32, CoFe2 nm was used. For the overlying first tunnel barrier layer 21, $Al_2O_3$2 nm was used. The plasma oxidization and natural oxidization of an Al metal film were used for the formation of the Al2O3. The third ferromagnetic layer 33 was made of CoFe2 nm and the antiferromagnetic layer 34 was made of MnPt12 nm.

Besides the materials mentioned above, the following materials may also be used in the present embodiment in the same manner as in the foregoing embodiments. For the magnetic semiconductor 11, GaMnN, CrAs, CrSb, CoTiO2 CoZnO, MnZnO, MnC, MnAs, MnSi, FeSi, FeGe, MnGe, or MnC may be used in place of GaMnAs. For the first non-magnetic layer 41 and the second non-magnetic metal layer 42, Au, Ag, or Pt may also be used in place of Cu. For the ferromagnetic layer 31, Co or NiFe may also be used in place of CoFe. For the second ferromagnetic layer 32, a CoFe/NiFe multilayer film may also be used in place of CoFe. For the third ferromagnetic layer, a so-called CoFe/Ru/CoFe synthetic ferrimagnet structure may also be used. For the antiferromagnetic layer 34, MnIr may also be used in place of MnPt.

Photolithography, etching, and EB lithography were used for the formation of the device.

The magnetoresistance effect obtained in the three terminal magnetoresistance device thus produced was 300%. The characteristic shows a value larger by one order of magnitude than the rate of resistance change (30%) of a conventional giant magnetoresistance device. The current between the electrodes 52 and 53 was 100 $\mu$A.

Embodiment 6

Figure 8:
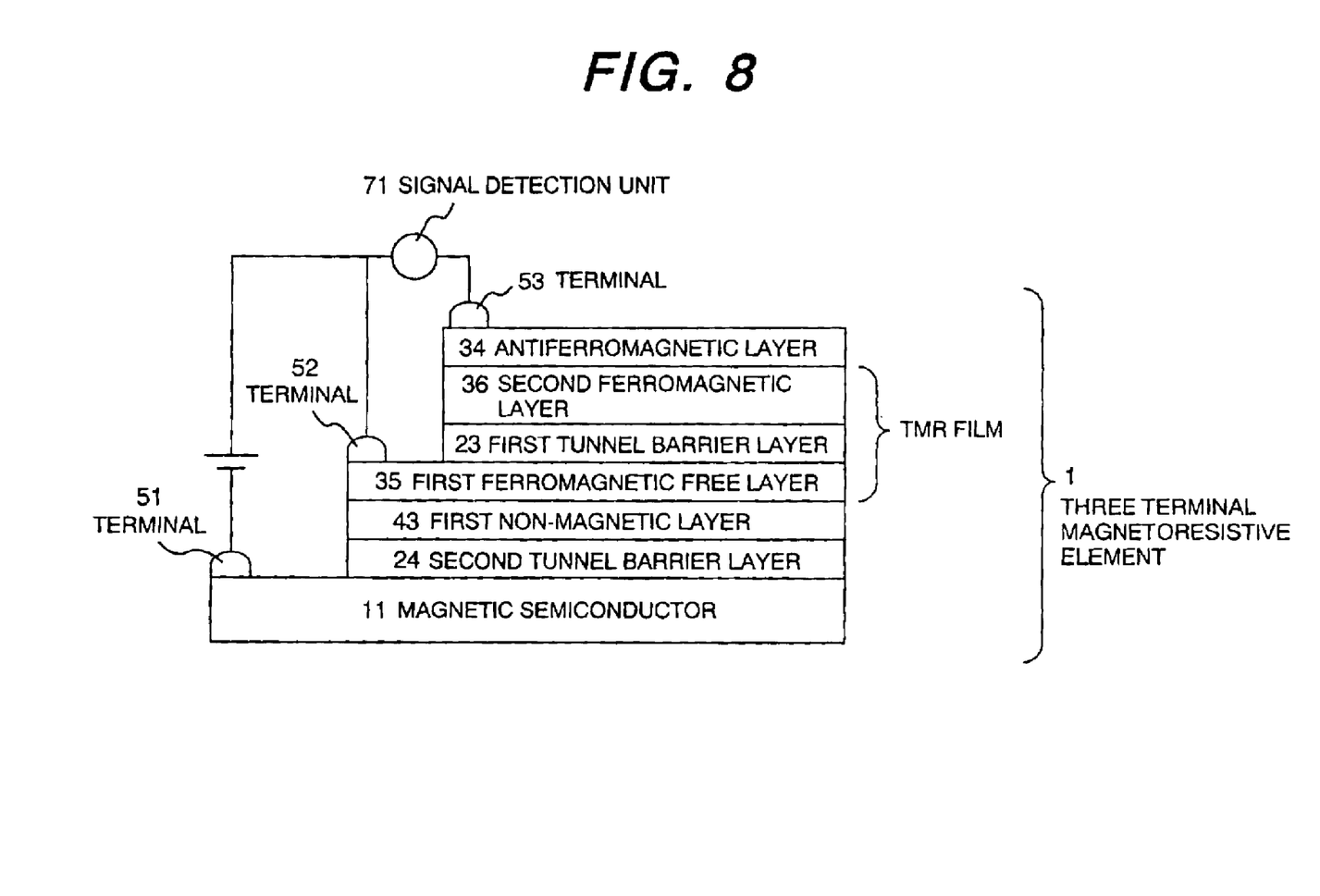
FIG. 8 is a view showing yet another example of the structure of the three terminal magnetoresistance device used in the three terminal magnetic head according to the present invention.

FIG. 8 shows a three terminal magnetoresistance effect having a structure obtained by forming the multilayer film between the second and first tunnel barriers in the structure shown in FIG. 6 from the non-magnetic layer 43 and the first ferromagnetic layer 35. It is to be noted that the second ferromagnetic layer 32 and the third ferromagnetic layer 33 in FIG. 6 correspond to the first ferromagnetic layer. 35 and the second ferromagnetic layer 36 in FIG. 8, respectively. The materials used for the device according to the present embodiment are the same as used in the structure described in EMBODIMENT 5.

Photolithography, etching, and EB lithography were used for the formation of the device in the same manner as in EMBODIMENT 5.

The magnetoriesistance effect obtained in the three terminal magnetoresistance device thus produced was 250%. The current between the electrodes 52 and 53 was 100 $\mu$A.

Embodiment 7

Figure 7:
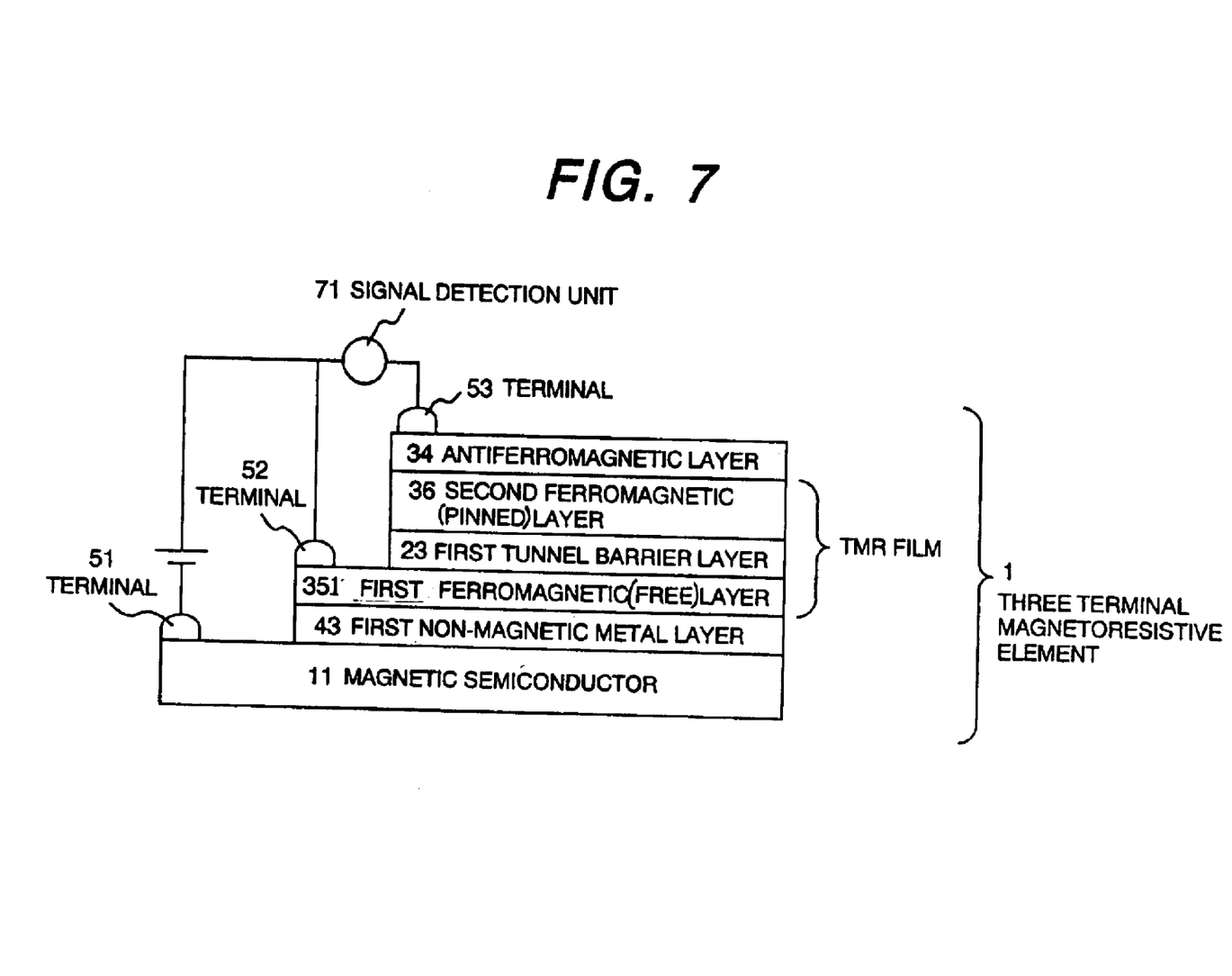
FIG. 7 is a view showing still another example of the structure of the three terminal magnetoresistance device used in the three terminal magnetic head according to the present invention.

FIG. 7 shows a three terminal magnetoresistance device having a structure obtained by removing the second tunnel barrier layer from the structure shown in FIG. 8. The materials used for the device according to the present embodiment are the same as used in the structure described in EMBODIMENT 5. For the tunnel barrier 23 in the structure according to the present embodiment, Al2O3 formed by oxidizing an Al metal film was used. For the non-magnetic layer 43, Cu was used.

The device formation method was also implemented by using photolithography, etching, and EB lithography in the same manner as in EMBODIMENT 1.

Since the three terminal magnetoresistance device thus produced has no tunnel barrier between the magnetic semiconductor 11 and the non-magnetic layer 43, highly polarized spins in the magnetic semiconductor are injected diffusively so that the efficiency with which the highly polarized spins are injected is reduced. However, since conductive electrons in the magnetic semiconductor are semi-metallic, an ohmic junction is formed at the interface between the magnetic semiconductor and the first non-magnetic metal layer so that the resistance is reduced. This suppresses the attenuation of a current.

In the present embodiment, the current between the electrodes 52 and 53 exhibited a large value of about 1 mA, though the magnetoresistance effect obtained was 100%.

Embodiment 8

Figure 9:
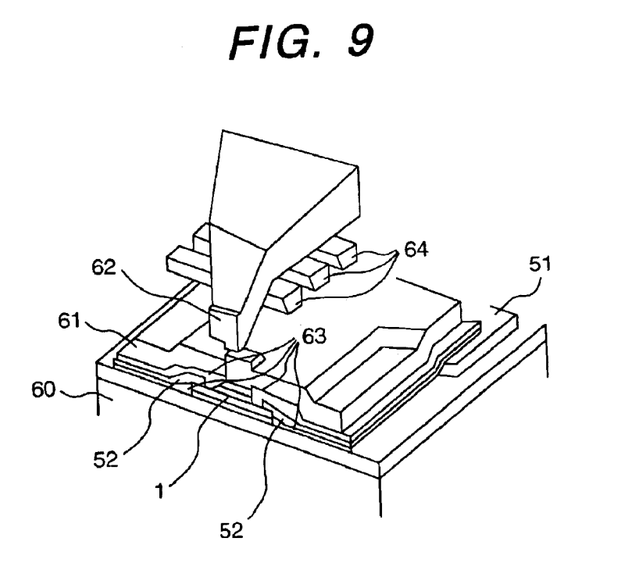
FIG. 9 is a view showing an example of a schematic perspective view of a recording/reproducing head using the three terminal magnetoresistance device according to the present invention.

FIG. 9 is a conceptual view showing an example of a magnetic head provided with the three terminal magnetoresistance device 1 according to the present invention. The magnetic head is composed of the three terminal magnetoresistance device 1, the electrode 51, the electrode 52, a lower shield NiFe 61 with a thickness of 100 nm, an upper shield/lower core NiFe 61 with a thickness of 1 $\mu$m, an interlayer insulating/protecting film 63, a coil 64, and upper core CoNiFe 62 which are formed on a substrate 60. The upper shield/lower core 61 also functions as the electrode 53.

Figure 10:
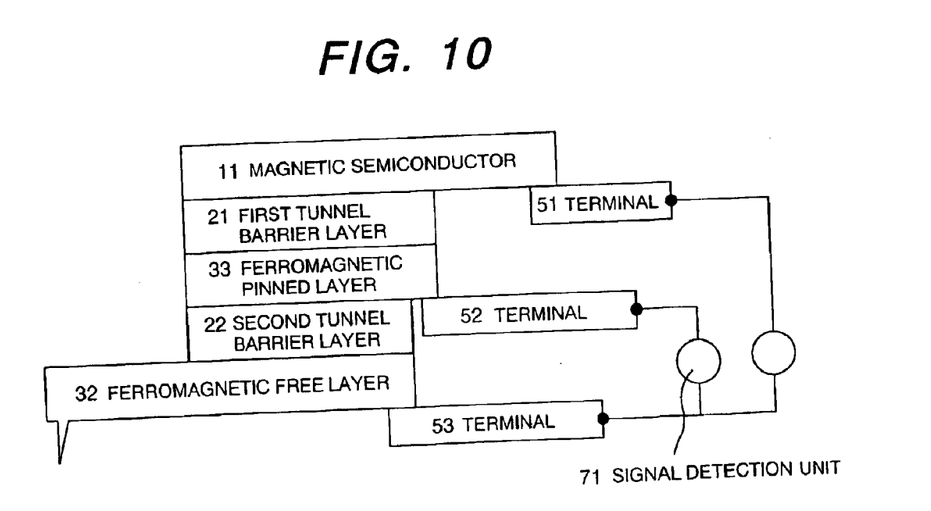
FIG. 10 shows an example of the outline of a reproducing heat using the three terminal magnetoresistance device according to the present invention.

FIG. 10 shows an example of the magnetic head provided with the three terminal magnetoresistance device 1 according to the present invention. The ferromagnetic free layer of the three terminal magnetoresistance device 1 also serves as a probe-type recording head for writing information in a magnetic recording medium. The electrodes 52 and 53 are disposed to detect an output between the second ferromagnetic free layer 32 and the first ferromagnetic layer 31, while the electrode 51 is connected to the magnetic semiconductor 11. The following is a method for sensing the output.

A variation in resistance between the electrodes 52 and 53 is detected by allowing a sense current to flow between the electrodes 51 and 53. A detection signal may be a voltage output or a current output.

Figure 11:
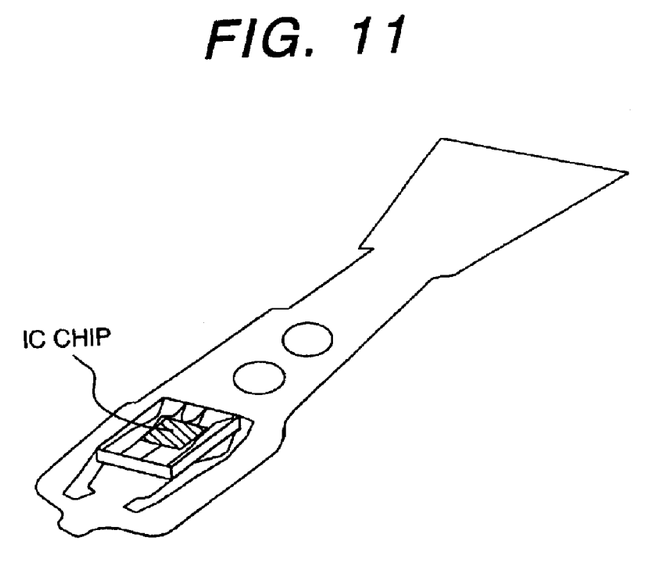
FIG. 11 is a perspective view showing the outline of an example of an IC-chip-embedded gimbal provided with a three terminal magnetoresistance head according to the present invention.
Figure 12:
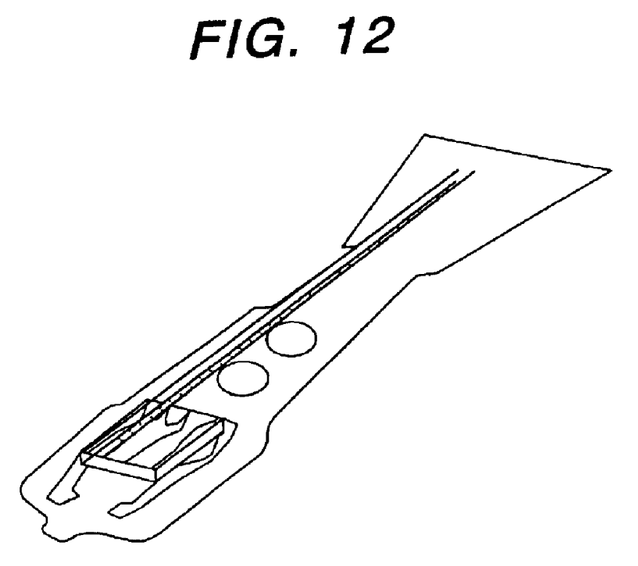
FIG. 12 is a perspective view showing the outline of an example of a wire-extracted gimbal provided with the three terminal magnetoresistance head according to the present invention.

FIG. 11 shows a typical example of an IC-chip-embedded gimbal provided with the three terminal magnetoresistance head according to the present invention. A power supply and a detection system required to detect the output of the three terminal magnetoresistance device are provided in an IC chip. FIG. 12 shows a typical example of a wire-extracted gimbal provided with the three terminal magnetoresistance head according to the present invention. A wire extracted from the three terminal magnetoresistance head is connected to the power supply and detection system of the apparatus. The extraction of the wire from the three terminal magnetoresistance device and electrode terminals are implemented by, e.g., the arrangement shown in FIG. 7.

Figure 13:
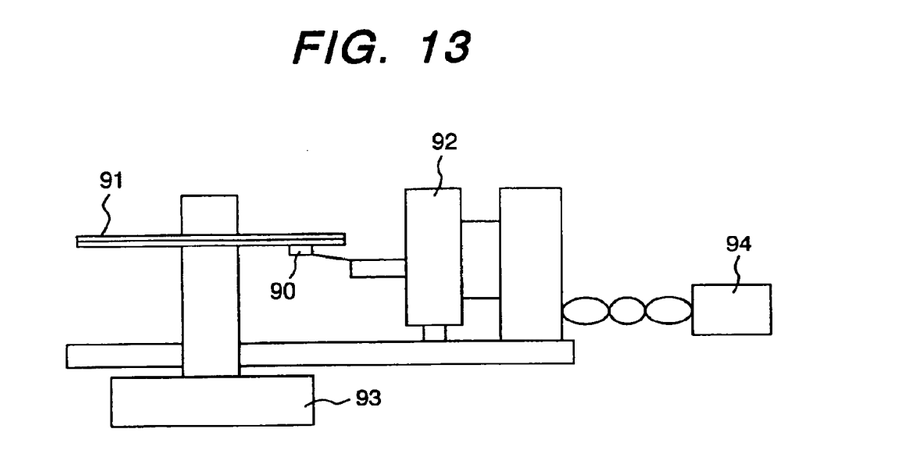
FIG. 13 is a view showing an example of a structure of a magnetic recording/reproducing apparatus provided with the three terminal magnetoresistance head according to the present invention.

FIG. 13 shows an example of a structure of a magnetic recording/reproducing apparatus according to the present invention. A recording medium 91 for magnetically recording information is rotated by using a spindle motor 93 and a head slider 90 is guided by an actuator 92 onto a track on the recording medium 91. In a magnetic disk apparatus, a reproducing head and a recording head formed on the head slider 90 move relatively in proximity to a given recording position on the recording medium 91 in accordance with the mechanism and successively write and read signals.

The actuator 92 is preferably a rotary actuator. A signal is recorded on a medium by using the recording head via a signal processing system 94 and the output of the reproducing head is processed by the signal processing system 94 to provide a signal. In moving the reproducing head onto a desired recording track, a position on the track is detected by using the highly sensitive output from the reproducing head according to the present embodiment and the positioning of the head slider can be performed by controlling the actuator.

Although the number of each of the head slider 90 and the recording medium 91 shown in FIG. 13 is one, a plurality of head sliders and a plurality of recording media may also be provided. The recording medium 91 may also have recording media on both sides thereof such that information is recorded therein. If information is recorded on both sides of a disk, the head slider 90 is disposed properly on each of the sides of the disk. The foregoing magnetic recording apparatus provided with the three terminal magnetoresistance device comprising the completely polarized spin injected layer 31 exhibited more excellent characteristics suitable for high-density recording than a magnetic recording apparatus provided with a sensor having a conventional structure. This allows a magnetic head providing for a recording density of 500 Gb/in$^2$ or more to be implemented.

By providing a magnetic recording apparatus with a three terminal magnetic head using a three terminal magnetoresistance device having a combination of a magnetic semiconductor and a TMR element as described above, the magnetic recording apparatus which is higher in density than a conventional magnetic recording apparatus can be provided.

What is claimed is:

1. A three terminal magnetic head comprising:
   a magnetic semiconductor;
   a magnetic multilayer film having a first ferromagnetic layer formed on said magnetic semiconductor, a second ferromagnetic layer formed on said first ferromagnetic layer, and a first non-magnetic layer formed between said first and second ferromagnetic layers;
   a tunnel magnetoresistive film having said second ferromagnetic layer, a third ferromagnetic layer formed on said second ferromagnetic layer, and a first tunnel barrier layer formed between said second and third ferromagnetic layers;
   a first electrode connected electrically to the magnetic semiconductor;
   a second electrode connected electrically to one of said first ferromagnetic layer, said first non-magnetic layer, and said second ferromagnetic layer; and
   a third electrode connected electrically to said third ferromagnetic layer,
   wherein a current is controlled to flow between said first and third electrodes to allow a tunnel current to flow into said tunnel magnetoresistive film through said magnetic semiconductor and said magnetic multilayer film, and
   a direction of magnetization of said second ferromagnetic layer changes upon application of an external magnetic field and a resistance change caused by the changed direction of magnetization being detected by said second and third electrodes.

2. The three terminal magnetic head of claim 1, wherein a direction of magnetization of said first ferromagnetic layer is fixed.

3. The three terminal magnetic head of claim 1, wherein a direction of magnetization of said third ferromagnetic layer is fixed.

4. The three terminal magnetic head of claim 3, wherein the direction of magnetization of said third ferromagnetic layer is fixed by an antiferromagnetic layer formed on a side opposite to a side opposing said first tunnel barrier layer.

5. The three terminal magnetic head of claim 4, wherein said third electrode is connected electrically to said antiferromagnetic layer.

6. The three terminal magnetic bead of claim 5, wherein a second tunnel barrier layer is formed between said magnetic semiconductor and said second ferromagnetic layer.

7. The three terminal magnetic head of claim 5, wherein a second non-magnetic layer is formed between said magnetic semiconductor and said first ferromagnetic layer.

8. The three terminal magnetic bead of claim 7, wherein a second tunnel barrier layer is formed between said magnetic semiconductor and said second non-magnetic layer.

9. The three terminal magnetic head of claim 1, wherein said magnetic semiconductor contains at least one of Ga, As, Cr, Mn, N, Fe, Co, Ge, Si, and C.

10. The three terminal magnetic head of claim 1, wherein each of said first ferromagnetic layer, said second ferromagnetic layer, and said third ferromagnetic layer contains any one of Co, Fe, and Ni.

11. The three terminal magnetic head of claim 1, wherein each of said first and second non-magnetic layers contains any one of Cu, Au, Ag, and Pt.

12. The three terminal magnetic head of claim 1, wherein said magnetic semiconductor is formed by molecular beam epitaxy.

13. A three terminal magnetic head comprising:
    a magnetic semiconductor;
    a non-magnetic layer formed on said magnetic semiconductor;
    a tunnel magnetoresistive film having first and second ferromagnetic layers formed on said non-magnetic layer, a first tunnel barrier layer formed between said first and second ferromagnetic layers, and an antiferromagnetic layer formed on said second ferromagnetic layer;
    a first electrode connected electrically to said magnetic semiconductor;
    a second electrode connected electrically to said first ferromagnetic layer or said non-magnetic layer; and
    a third electrode connected electrically to said second ferromagnetic layer or said antiferromagnetic layer,
    wherein a current is controlled to flow between said first and third electrodes to allow a tunnel current to flow into said tunnel magnetoresistive film through said magnetic semiconductor and said non-magnetic film, and
    a direction of magnetization of said first ferromagnetic layer changes upon application of an external magnetic field and a resistance change caused by the changed direction of magnetization being detected by said second and third electrodes.

14. The three terminal magnetic head of claim 13, wherein a second tunnel barrier layer is further formed between said magnetic semiconductor and said non-magnetic layer.

15. A magnetic recording/reproducing apparatus comprising a three terminal magnetic head comprising:
    a magnetic semiconductor;
    a magnetic multilayer film having a first ferromagnetic layer formed on said magnetic semiconductor, a second ferromagnetic layer formed on said first ferromagnetic layer, and a first non-magnetic layer formed between said first and second ferromagnetic layers;
    a tunnel magnetoresistive film having said second ferromagnetic layer, a third ferromagnetic layer formed on said second ferromagnetic layer, and a first tunnel barrier layer formed between said second and third ferromagnetic layers;
    a first electrode connected electrically to the magnetic semiconductor;
    a second electrode connected electrically to one of said first ferromagnetic layer, said first non-magnetic layer, and said second ferromagnetic layer; and a third electrode connected electrically to said third ferromagnetic layer, wherein a current is controlled to flow between said first and third electrodes to allow a tunnel current to flow into said tunnel magnetoresistive film through said magnetic semiconductor and said magnetic multilayer film, and a direction of magnetization of said second ferromagnetic layer changes upon application of an external magnetic field and a resistance change caused by the changed direction of magnetization being detected by said second and third electrodes.

16. A magnetic recording/reproducing apparatus according to claim 15, wherein a direction of magnetization of said first ferromagnetic layer is fixed.

17. A magnetic recording/reproducing apparatus according to claim 15, wherein a direction of magnetization of said third ferromagnetic layer is fixed.

18. A magnetic recording/reproducing apparatus according to claim 15, wherein the direction of magnetization of said third ferromagnetic layer is fixed by an antiferromagnetic layer formed on a side opposite to a side opposing said first tunnel barrier layer.

19. A magnetic recording/reproducing apparatus according to claim 15, wherein said third electrode is connected electrically to said antiferromagnetic layer.

20. A magnetic recording/reproducing apparatus according to claim 15, wherein a second tunnel barrier layer is formed between said magnetic semiconductor and said second ferromagnetic layer.

21. A magnetic recording/reproducing apparatus according to claim 15, wherein a second non-magnetic layer is formed between said magnetic semiconductor and said first ferromagnetic layer.

22. A magnetic recording/reproducing apparatus according to claim 15, wherein a second tunnel barrier layer is formed between said magnetic semiconductor and said second non-magnetic layer.

23. A magnetic recording/reproducing apparatus comprising a three terminal magnetic head comprising:

a magnetic semiconductor;

a non-magnetic layer formed on said magnetic semiconductor;

a tunnel magnetoresistive film having first and second ferromagnetic layers formed on said non-magnetic layer, a first tunnel barrier layer formed between said first and second ferromagnetic layers, and an antiferromagnetic layer formed on said second ferromagnetic layer;

a first electrode connected electrically to said magnetic semiconductor;

a second electrode connected electrically to said first ferromagnetic layer or said non-magnetic layer; and a third electrode connected electrically to said second ferromagnetic layer or said antiferromagnetic layer, wherein a current is controlled to flow between said first and third electrodes to allow a tunnel current to flow into said tunnel magnetoresistive film through said magnetic semiconductor and said non-magnetic film, and a direction of magnetization of said first ferromagnetic layer changes upon application of an external magnetic field and a resistance change caused by the changed direction of magnetization being detected by said second and third electrodes.

24. A magnetic recording/reproducing apparatus according to claim 23, wherein a second tunnel barrier layer is further formed between said magnetic semiconductor and said non-magnetic layer.

25. A magnetic recording/reproducing apparatus according to claim 23, wherein said magnetic semiconductor contains at least one of Ga, As, Cr, Mn, N, Fe, Go, Ge, Si, and C.

26. A magnetic recording/reproducing apparatus according to claim 23, wherein each of said first ferromagnetic layer, said second ferromagnetic layer, and said third ferromagnetic layer contains any one of Go, Fe, and Ni.

27. A magnetic recording/reproducing apparatus according to claim 23, wherein each of said first and second non-magnetic layers contains any one of Cu, Au, Ag, and Pt.

28. A magnetic recording/reproducing apparatus according to claim 23, wherein said magnetic semiconductor is formed by molecular beam epitaxy.

* * * * *